United States Patent
Liao et al.

(10) Patent No.: US 11,178,313 B2
(45) Date of Patent: Nov. 16, 2021

(54) IMAGE DISPLAY METHOD, IMAGE DISPLAY DEVICE, SMART TV AND READABLE STORAGE MEDIUM

(71) Applicant: SHENZHEN TCL NEW TECHNOLOGY CO., LTD., Guangdong (CN)

(72) Inventors: Wenwu Liao, Guangdong (CN); Hongwei Bai, Guangdong (CN)

(73) Assignee: SHENZHEN TCL NEW TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/761,261

(22) PCT Filed: May 8, 2019

(86) PCT No.: PCT/CN2019/085952
§ 371 (c)(1),
(2) Date: May 4, 2020

(87) PCT Pub. No.: WO2020/057139
PCT Pub. Date: Mar. 26, 2020

(65) Prior Publication Data
US 2020/0280657 A1    Sep. 3, 2020

(30) Foreign Application Priority Data
Sep. 17, 2018 (CN) .......................... 201811081831.0

(51) Int. Cl.
*H04N 5/06* (2006.01)
*H04N 5/57* (2006.01)
(52) U.S. Cl.
CPC ................. *H04N 5/06* (2013.01); *H04N 5/57* (2013.01)

(58) Field of Classification Search
CPC ............. H04N 19/85; H04N 5/06; H04N 5/44
See application file for complete search history.

(56) References Cited

U.S. PATENT DOCUMENTS 6,014,494 A * 1/2000 Minechika ........... G11B 15/125
                                                386/314
6,356,660 B1 * 3/2002 Shannon .................. G06T 9/00
                                                382/232
(Continued)

FOREIGN PATENT DOCUMENTS

CN          1422074 A      6/2003
CN          1750083 A      3/2006
(Continued)

OTHER PUBLICATIONS

International Search Report of PCT Patent Application No. PCT/CN2019/085952 dated Jul. 29, 2019.

*Primary Examiner* — Paulos M Natnael
(74) *Attorney, Agent, or Firm* — Nathan & Associates; Nathan Menachem

(57) ABSTRACT

Disclosed are an image display method, a device, a smart TV, and a readable storage medium. The image display method includes: acquiring an original image signal of a current frame image; extracting evenly spaced rows of data from the original image signal of the current frame image to form a pre-processed image signal; acquiring each row of data in the pre-processed image signal, scanning the each row of data, synchronously acquiring at least two rows of scan images corresponding to the each row of data to form a display image of the current frame image; and acquiring a frame frequency of the original image signal and a vertical synchronization signal of the display image, controlling a period of a backlight pulse signal according to the frame frequency, controlling a duty cycle of the backlight pulse (Continued)

signal according to a period of the vertical synchronization signal, and displaying the display image.

17 Claims, 6 Drawing Sheets

(56) References Cited

U.S. PATENT DOCUMENTS

| | | | | |
|---|---|---|---|---|
| 7,548,658 | B1* | 6/2009 | Rudin | H04N 19/593 375/240.12 |
| 9,378,704 | B2 | 6/2016 | Choi et al. | |
| 9,495,911 | B2* | 11/2016 | Takanohashi | G09G 3/3275 |
| 2005/0231498 | A1* | 10/2005 | Abe | G09G 3/20 345/204 |
| 2007/0211014 | A1* | 9/2007 | Kim | G09G 3/3406 345/102 |
| 2008/0170062 | A1* | 7/2008 | Ma | G06F 1/04 345/214 |
| 2010/0114568 | A1* | 5/2010 | Yoon | G10L 19/18 704/223 |
| 2014/0270362 | A1* | 9/2014 | Najafi Shoushtari | G06K 9/6204 382/103 |
| 2014/0286526 | A1* | 9/2014 | Wang | G06T 1/0057 382/100 |
| 2017/0110068 | A1* | 4/2017 | Lee | G09G 3/342 |
| 2017/0310743 | A1* | 10/2017 | Aoyama | H04L 27/2602 |

FOREIGN PATENT DOCUMENTS

| | | |
|---|---|---|
| CN | 101017637 A | 8/2007 |
| CN | 101105922 A | 1/2008 |
| CN | 101212559 A | 7/2008 |
| CN | 103595985 A | 2/2014 |
| CN | 103761940 A | 4/2014 |
| CN | 105549205 A | 5/2016 |
| CN | 108076208 A | 5/2018 |
| JP | 2003066918 A | 3/2003 |

* cited by examiner

IMAGE DISPLAY METHOD, IMAGE DISPLAY DEVICE, SMART TV AND READABLE STORAGE MEDIUM

FIELD

The present disclosure relates to the field of electronic technology, and in particular, to an image display method, a device, a smart TV, and a readable storage medium.

BACKGROUND

At present, regarding most of the 60 HZ TV products on the market, when users watch motion images, the image display is not clear, and long-term viewing is likely to cause undesirable phenomena such as "dizziness", which brings users a very poor experience. In view of the above problem, the main technologies to solve this problem are 120 HZ Open Cell+MEMC+Blinking backlight technology or 60 HZ Open Cell+backlight Scanning+Local Diming technology, but these two technologies have problems of high cost and complex backlight driven architecture, respectively.

Therefore, it is necessary to provide a new image display method, device, smart TV and readable storage medium to solve the above technical problem.

SUMMARY

The main object of this disclosure is to provide an image display method, a device, a smart TV, and a readable storage medium, which are intended to solve the problem of unclear motion images.

To achieve the above object, the image display method provided in the present disclosure includes:

acquiring an original image signal of a current frame image;

according to a preset row extraction rule, extracting evenly spaced rows of data from the original image signal of the current frame image to form a pre-processed image signal of the current frame image;

acquiring each row of data in the pre-processed image signal, scanning the acquired each row of data, synchronously acquiring at least two rows of scan images corresponding to the each row of data to form a display image of the current frame image; and acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

Optionally, the operation of according to a preset row extraction rule, extracting evenly spaced rows of data from the original image signal of the current frame image to form a pre-processed image signal of the current frame image includes:

extracting odd rows of data or even rows of data from the original image signal of the current frame image to form the pre-processed image signal of the current frame image.

Optionally, the operation of according to a preset row extraction rule, extracting evenly spaced rows of data from the original image signal of the current frame image to form a pre-processed image signal of the current frame image includes:

acquiring a row extraction rule for the original image signal of a previous frame image;

in a determination that the original image signal of the previous frame image is subjected to row extraction processing according to a row extraction rule for extracting the odd rows of data, extracting the even rows of data from the original image signal of the current frame image to form the pre-processed image signal of the current frame image; and in a determination that the original image signal of the previous frame image is subjected to row extraction processing according to a row extraction rule for extracting the even rows of data, extracting the odd rows of data from the original image signal of the current frame image to form the pre-processed image signal of the current frame image.

Optionally, the operation of acquiring each row of data in the pre-processed image signal, scanning the acquired each row of data, synchronously acquiring at least two rows of scan images corresponding to the each row of data to form a display image of the current frame image includes:

acquiring each row of data in the pre-processed image signal row by row, scanning the acquired each row of data, synchronously acquiring two rows of scan images corresponding to the each row of data to form the display image of the current frame image.

Optionally, the operation of acquiring each row of data in the pre-processed image signal, scanning the acquired each row of data, synchronously acquiring at least two rows of scan images corresponding to the each row of data to form a display image of the current frame image includes:

acquiring a pixel resolution of a display screen; and determining a multiple relationship between a number of pixel rows of the display screen and a number of rows of the pre-processed image signal, synchronously acquiring the multiple rows of scan images corresponding to the each row of data according to the multiple relationship to form the display image of the current frame image.

Optionally, the operation of controlling a duty cycle of the backlight pulse signal according to a period of the vertical synchronization signal includes:

acquiring the duty cycle of the backlight pulse signal, and determining whether the duty cycle is less than a preset value;

if yes, controlling the backlight pulse signal to continue to output; and if not, adjusting a high-level ratio in a unit period of the backlight pulse signal.

Optionally, the preset value is determined according to a ratio of the period of the vertical synchronization signal of the display image to time taken by the original image signal to display a single frame image.

In addition, the present disclosure provides an image display device, including a memory, a processor, and an image display program stored on the memory and executable on the processor, and the processor executes the image display program to implement the following operations:

acquiring an original image signal of a current frame image;

according to a preset row extraction rule, extracting evenly spaced rows of data from the original image signal of the current frame image to form a pre-processed image signal of the current frame image;

acquiring each row of data in the pre-processed image signal, scanning the acquired each row of data, synchronously acquiring at least two rows of scan images corresponding to the each row of data to form a display image of the current frame image; and acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

Optionally, the processor executes the image display program to further implement the following operations:

extracting odd rows of data or even rows of data from the original image signal of the current frame image to form the pre-processed image signal of the current frame image.

In addition, the present disclosure provides a smart TV, including a processor, a memory, and an image display program stored on the memory and executable on the processor, and the processor executes the image display program to implement the above mentioned image display method.

In addition, the present disclosure provides a readable storage medium having stored thereon a control program, where a processor executes the control program to implement the above mentioned image display method.

In the technical solution of the present disclosure, according to a preset row extraction rule, extracting evenly spaced rows of data from the original image signal of the current frame image to form a pre-processed image signal of the current frame image. Then, acquiring each row of data in the pre-processed image signal, scanning the acquired each row of data, synchronously acquiring at least two rows of scan images corresponding to the each row of data to form a display image of the current frame image, and controlling the backlight module to display synchronously with the processed image according to the frequency of the pre-processed image and the vertical synchronization signal at the same time. In this way, the backlight pulse signal may control the backlight to be displayed synchronously with the processed image without the dragging phenomenon. At the same time, since at least two rows of scan images corresponding to each row of data are acquired simultaneously when scanning the acquired each row of data, that is, each row of scan images corresponding to the same row of data is the same, which reduces the scanning time of each frame. In this way, more time is reserved for the liquid crystal to respond, and finally the purpose of improving the clarity of the motion image is achieved.

BRIEF DESCRIPTION OF THE DRAWINGS

In order to explain the technical solutions in the embodiments of the present disclosure or the prior art more clearly, the drawings used in the description of the embodiments or the prior art are briefly introduced below. Obviously, the drawings in the following description are merely some embodiments of the present disclosure. For those of ordinary skill in the art, other drawings can be acquired according to the structure shown in the drawings without paying creative labor.

Figure 1:
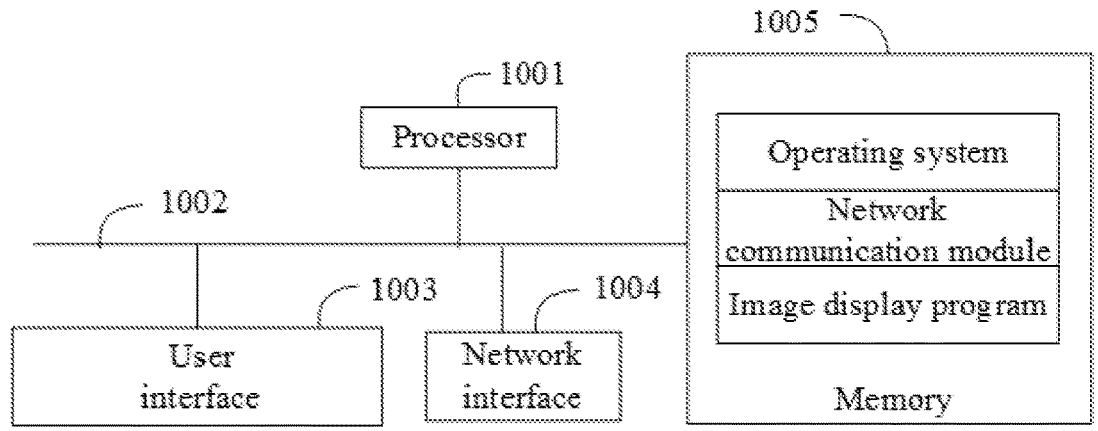
FIG. 1 is a schematic structural diagram of hardware modules of an image display device according to an embodiment of the present disclosure.

The implementation of the object, functional features and advantages of this disclosure will be further described with reference to the embodiments and the drawings.

DETAILED DESCRIPTION OF THE EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all of the embodiments. Based on the embodiments in the present disclosure, all other embodiments acquired by a person of ordinary skill in the art without creative efforts fall into the protection scope of the present disclosure.

It should be noted that all directional indicators (such as up, down, left, right, front, back, etc.) in the embodiments of the present disclosure are only used to explain the relative positional relationship, movement situation, etc. between components in a specific posture (as shown in the attached drawings), if the specific posture changes, the directional indication also changes accordingly.

In addition, descriptions related to "first", "second", etc. in this disclosure are for descriptive purposes only, and cannot be understood as indicating or implying their relative importance or implicitly indicating the number of technical features indicated. Therefore, the features defined as "first" and "second" may explicitly or implicitly include at least one of the features. In the description of the present disclosure, the meaning of "a plurality" is at least two, for example, two, three, etc., unless it is specifically and specifically defined otherwise.

In this disclosure, the terms "connected", "fixed", and the like should be understood in a broad sense unless otherwise specified and defined, for example, "fixed" may be a fixed connection, a detachable connection, or a whole; it may be a mechanical connection or an electrical connection; it may be directly connected or indirectly connected through an intermediate medium; it may be the internal connection of two elements or the interaction relationship between two elements, unless it is clearly defined otherwise. For those of ordinary skill in the art, the specific meanings of the above terms in this disclosure can be understood according to specific situations.

In addition, the technical solutions between the various embodiments of the present disclosure can be combined with each other, but must be based on what can be achieved by a person of ordinary skill in the art. When the combination of technical solutions conflicts or cannot be achieved, such a combination of technical solutions should be considered does not exist and is not within the scope of protection claimed in this disclosure.

The main idea of the solution of the embodiment of the present disclosure is: acquiring original image signal of a current frame image; according to a preset row extraction rule, extracting evenly spaced rows of data from the original image signal of the current frame image to form a pre-processed image signal of the current frame image; acquiring each row of data in the pre-processed image signal, scanning the acquired each row of data, synchronously acquiring at least two rows of scan images corresponding to the each row of data to form a display image of the current frame image, and the time required to scan the display image of the current frame image is 1/N of the time required to display the original image; according to a frame frequency of the original image signal and a period of the vertical synchronization signal of the display image, respectively controlling a period and a duty cycle of the backlight pulse signal, where time for the backlight source to be on in a pulse period is less than or equal to time required to display image, that is, less than or equal to a period of the vertical synchronization signal of display image. At this point, the holding state of the liquid crystal ends in the off state of the backlight source, and the liquid crystal can return to its original state in the off state of the backlight source, so that the liquid crystal can respond in time and display the next frame image signal when the next image is displayed, which is beneficial to improve the quality and clarity of motion image to avoid the dragging phenomenon due to the liquid crystal's late response.

The image display method according to the embodiment of the present disclosure is mainly applied to an image display device, and the image display device may be a personal computer (PC), a portable computer, a mobile terminal, a smart TV, and other devices with processing functions.

Referring to FIG. 1, FIG. 1 is a schematic structural diagram of hardware modules of an image display device according to an embodiment of the present disclosure. In an embodiment of the present disclosure, the image display device may include a processor 1001 (for example, a Central Processing Unit (CPU)), a communication bus 1002, a user interface 1003, a network interface 1004, and a memory 1005. The communication bus 1002 is configured to implement connection and communication between these components. The user interface 1003 may include a display and an input unit such as a keyboard. The network interface 1004 may optionally include a standard wired interface and a wireless interface (such as wireless fidelity Wireless-Fidelity, WI-FI interface). The memory 1005 may be a high-speed Random Access Memory (RAM), or a stable memory (non-volatile memory), such as disk memory, and the memory 1005 may optionally be a storage device independent of the foregoing processor 1001.

Those skilled in the art can understand that the hardware structure shown in FIG. 1 does not constitute a limitation on the present disclosure, and more or fewer components than shown in the figures may be included, or some components may be combined, or different components may be arranged.

With continued reference to FIG. 1, the memory 1005 as a computer-readable storage medium in FIG. 1 may include an operating system, a network communication module, and an image display program. In FIG. 1, the network communication module is mainly configured to connect to a server and perform data communication with the server; and the processor 1001 may call an image display program stored in the memory 1005.

Based on the hardware structure of the image display device described above, various embodiments of the image display method of the present disclosure are proposed.

The present disclosure provides an image display method.

Figure 2:
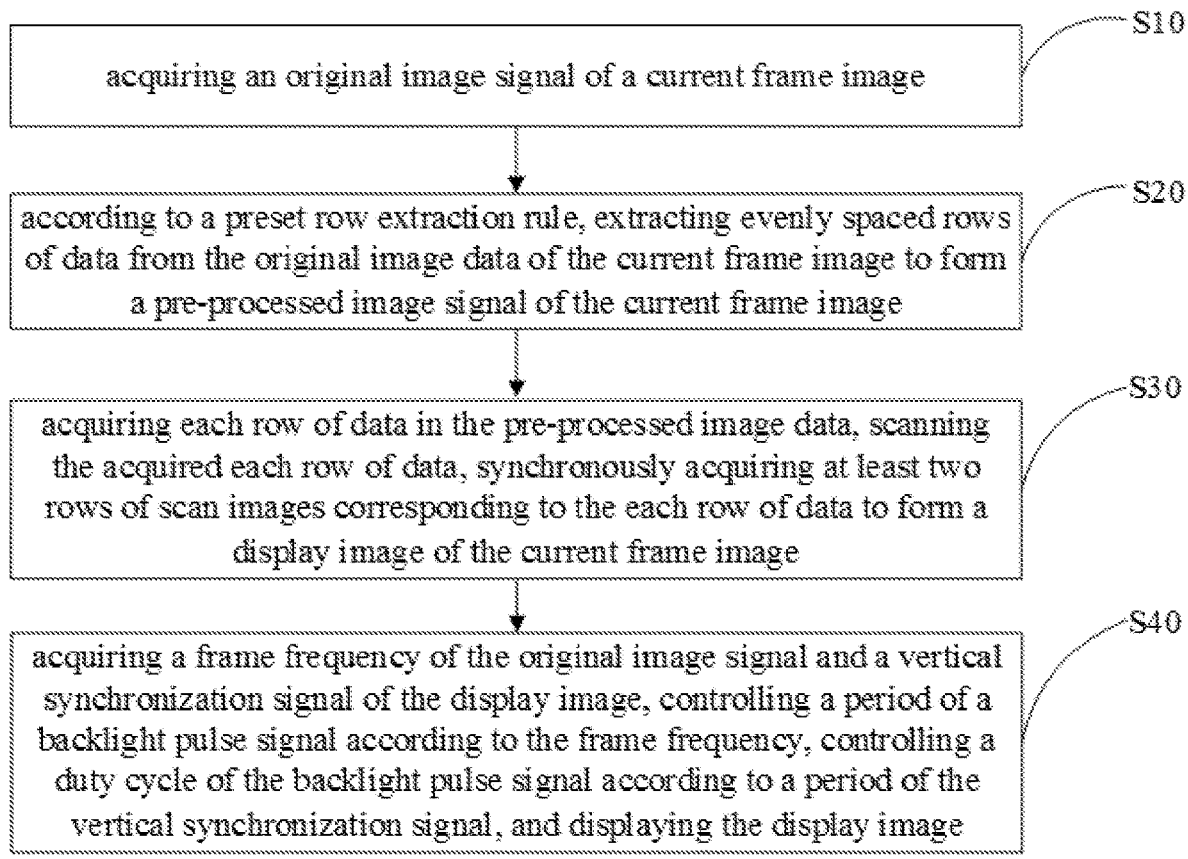
FIG. 2 is a schematic flowchart of an image display method according to a first embodiment of the present disclosure.

Referring to FIG. 2, FIG. 2 is a schematic flowchart of an image display method according to a first embodiment of the present disclosure. In this embodiment, the image display method includes the following operations:

Operation S10: acquiring an original image signal of a current frame image.

The memory 1005 stores several frames of image data of the original image. When the original image needs to be displayed, the data needs to be acquired frame by frame and displayed on the display screen frame by frame. Different resolution displays have different pixel resolutions, such as 1080P display (1920×1080 pixels), 2K display (2560×1440 pixels), 4K2K display (3840×2160 pixels), and 4K display (4096×2160 pixels). Generally, the resolution of the original image signal corresponds to the resolution of the display screen. Taking the resolution of the original image signal and the display screen as 4K2K as an example, the original image signal includes 2160 rows of data and 3840 columns of data, each row of data in the original image signal is scanned and displayed on each row of pixels on the display screen when the image is displayed. When the numbers of rows and columns of the original image signal are different from the pixel resolution of the display screen, when the display is performed, a corresponding algorithm is used to scale the original image signal before displaying it.

Operation S20: according to a preset row extraction rule, extracting evenly spaced rows of data from the original image signal of the current frame image to form a pre-processed image signal of the current frame image.

After acquiring the original image signal, taking the resolution of the original image signal as 4K2K as an example, the original image signal includes 2160 rows of data, according to a preset row extraction rule, extracting evenly spaced rows of data from the original image signal to form a pre-processed image signal of the current frame image. For example, referring to FIG. 3, the preset row extraction rule stipulates that several rows of data with evenly spaced 1 row are extracted from the original image signal. At this time, the extracted pre-processed image signal may include a first row of data, a third row of data, a fifth row of data, a seventh row of data . . . a total of 1080 rows of data of the original image signal. At this time, the pre-processed image signal includes 1080 rows of data, each row includes 3840 pixels, and there are a total of 3840×1080 pixels. Alternatively, the preset extraction rule stipulates that several rows of data with evenly spaced 2 rows are extracted from the original image signal (that is, a row number of a subsequent row minus a row number of a previous row is equal to 3). At this time, the extracted pre-processed image signal may include a first row of data, a fourth row of data, a seventh row of data, a tenth row of data . . . a total of 720 rows of data of the original image signal. At this time, the pre-processed image signal includes 720 rows of data, each row includes 3840 pixels, and there are a total of 3840×720 pixels. In order to ensure the image quality of the pre-processed image, a number of uniformly spaced rows referred to in the extraction rule is preferably 1 or 2.

In addition to specify the number of uniformly spaced rows in the preset extraction rule, it is possible to specify the first extracted row of data to ensure that the motion image presents the original image completely. For example, when the preset extraction rule specifies that several rows of data with evenly spaced 2 rows are extracted from the original image signal, and row extraction of the first frame is started from the first row of data, row extraction of the second frame is started from the second row of data, row extraction of the third frame is started from the third row of data, . . . , row extraction of the 3n+1 frame is started from the first row of data, row extraction of the 3n+2 frame is started from the second row of data, and row extraction of the 3n+3 frame is started from the third row of data, where n is a natural number.

Operation S30: acquiring each row of data in the pre-processed image signal, scanning the acquired each row of data, synchronously acquiring at least two rows of scan images corresponding to the each row of data to form a display image of the current frame image.

Specifically, after each row of data of the pre-processed image signal is acquired, each row of data is scanned. For each row of data, at least two rows of scan images corresponding to the row of data are acquired synchronously, that is, each of the at least two rows of scan images acquired synchronously is the same, and each row of scan images is acquired synchronously.

As for a Thin Film Transistor Liquid Crystal Display (TFT-LCD) as a mainstream display screen, a TFT-LCD is taken as an example to describe its implementation. First of all, for a TFT-LCD, the driving method of the liquid crystal is integrating a thin film transistor behind each liquid crystal pixel, and the driving voltage of the liquid crystal is controlled by controlling the thin film transistor to switch on and off. Each pixel is controlled by a thin film transistor integrated on itself, which is an active pixel. At present, the liquid crystal screen adopts a matrix display mode, which is controlled by a timing control board, and its structural characteristics are: horizontally arranging a row of row electrodes with the same number of vertical displayed pixels on the display screen, and vertically arranging a column of column electrodes with the same number of horizontal displayed pixels on the display screen, and the row electrode lines and the column electrode lines are perpendicular to each other (for example, the 1080P screen has 1080 row electrode lines and 1920 column electrode lines). The vertical intersection of a row electrode line and a column electrode line is the position of a pixel. To "turn on" a pixel point, voltage must be applied to the row electrode line and the column electrode line at the same time. Moreover, the liquid crystal screen displays pixels of a row of signals on the screen at the same time, that is, there is no time sequence for a row of pixel signals, that is, the liquid crystal screen displays parallel pixel signals. At this time, the same column driving signal is sent to the liquid crystal pixels in the same column. When at least two rows of row driving signals are sent synchronously, the liquid crystal pixels located in the same column are turned on at the same time, and the display images are the same.

Figure 4:
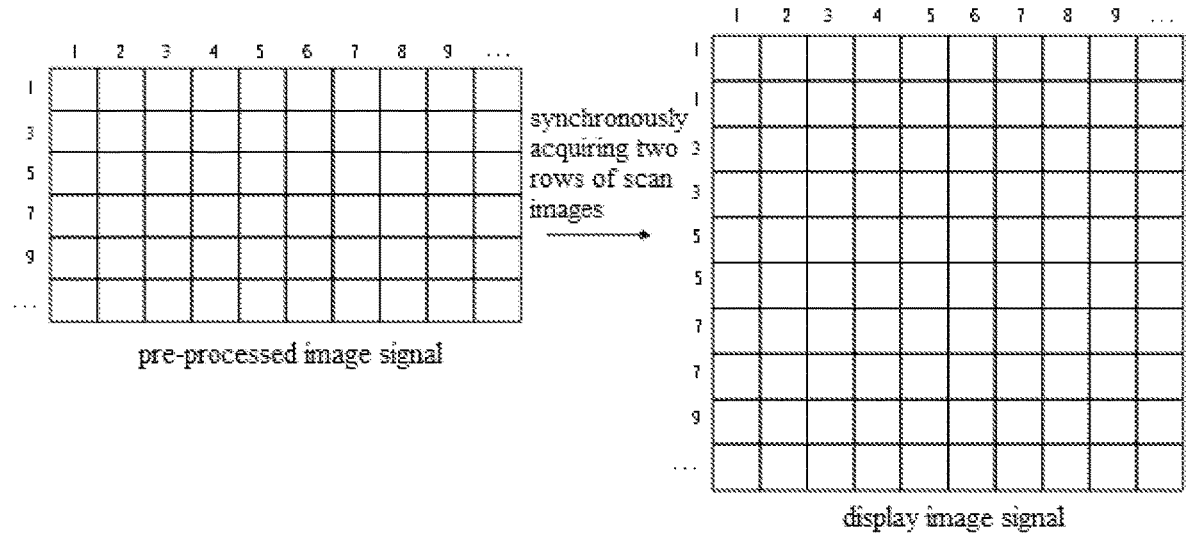
FIG. 4 is a schematic diagram of a scanning manner of the image display method of the present disclosure.

Taking extracting rows with evenly spaced 1 row as an example, when the data of the pre-processed image signal is acquired, a number of rows of the pre-processed image signal is ½ of a number of rows of the original image signal. At this time, since the display screen may display rows of data with a row number equivalent to a row number of the original image signal, at this time, if the rows of data of the pre-processed image signal are scanned and displayed row by row on the display screen, only ½ rows of the display screen has images displayed, and the remaining areas will be displayed in black, which seriously affects the quality of the image. Therefore, after acquiring each row of data in the pre-processed image signal, and performing at least two rows synchronous scanning of on the acquired each row of data, it is possible to synchronously acquiring at least two rows of scan images corresponding to each row of data. Continue to take extracting rows with evenly spaced 1 row as an example. After acquiring the data of each row of the pre-processed image, performing two-row synchronous scanning on each row of data, and then acquiring at least two rows of scan images corresponding to each row of data. Referring to FIG. 4, the first row of data of the pre-processed image is acquired for two-row synchronous scanning. The acquired display image is an image of a first row of data, an image of a first row of data, an image of a third row of data, an image of a third row of data . . . , that is, each row of data is simultaneously displayed on the display screen with two rows of the same scan images. Similarly, when extracting rows with evenly spaced 2 rows, the display image acquired after scanning is an image of a first row of data, an image of a first row of data, an image of a first row of data, an image of a fourth row of data, an image of a fourth row of data, an image of a fourth row of data . . . that is, each row of data is simultaneously displayed on the display screen with three rows of the same scan images. The significance of acquiring at least two rows of scan images corresponding to each row of data is to ensure the image quality of the static image, so as to avoid the situation that the upper part of the display image acquired after scanning has an image and the lower part is black, and scanning time of each frame image may be shortened, thus leaving more time for the liquid crystal to respond to the next frame image signal.

A frame frequency refers to a number N of frames (that is, static images) that can be played in one second. The scanning time from the start of the first row to the end of the last row of each frame of the original image is 1/N seconds, that is, it takes 1/N seconds to display one frame of the original image. After the original image signal is subjected to row extraction processing, for example, a preset extraction rule provides that several rows of data with evenly spaced 2 rows are extracted from the original image signal to form a pre-processed image signal with a total of 3840×720 pixels. At this time, if the pre-processed image signal is scanned row by row, the scanning time is ⅓N seconds.

Operation S40: acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

The processor 1001 determines the period of the backlight pulse signal according to the frame frequency of the original image signal, and the period of the backlight pulse signal is equal to the time to complete scanning of each frame image, that is, the time from the start of the scanning of each frame image to the end of the scanning of each frame image. At the same time, the processor 1001 controls the duty cycle of the backlight pulse signal according to the period of the vertical synchronization signal of the display image. The duty cycle refers to the proportion of the backlight source that is on in one period. The period of the vertical synchronization signal of the display image refers to the scanning time of the pre-processed image signal to form the display image by scanning row by row.

For example, when scanning and displaying according to the original image signal, assuming that the scanning time for completing one frame of the original image is 16 ms, the period of the backlight pulse signal is 16 ms, and the backlight source is on for the entire period, at this time, the duty cycle is close to 100%. When extracting rows with evenly spaced 1 row, the scanning time of the pre-processed image signal is 8 ms. At this time, the period of the backlight source is 16 ms. The display of the pre-processed image is realized in the first 8 ms, and there's no image signal is input in the next 8 ms, the backlight source needs to be in the off state, that is, the display screen is black in the next 8 ms. At this time, the duty cycle of the backlight pulse signal at least cannot be greater than 50%. For the liquid crystal screen, after the liquid crystal responds to the image signal of the first 8 ms and displays the image, the image can be held for a certain period of time, and then the liquid crystal can be restored to the original state within the time when the backlight source is off in the next 8 ms to prepare for responding to the image signal of the next frame. Therefore, the setting of the period and duty cycle of the backlight pulse signal is not only conducive to ensuring the display quality of the image, but also provides more time for the liquid crystal to prepare the response of the next frame, and improves the response accuracy of the liquid crystal, thereby improving the sharpness of dynamic image.

The processor 1001 acquires each frame of image data from the memory 1005, converts the data signals of each frame of image data into row driving signals and column driving signals, and then loads the row driving signals and column driving signals into the matrix circuit of the display screen, an image is arranged on the display screen after "addressing", and then a bright image is formed under the effect of the backlight source. The column driving signals reflect the pixel information of the image content, the row driving signals are displacement pulses that drive up and down scanning, and the column signals are driven row by row to display, and the column signals on a row are displayed simultaneously. In this embodiment, when performing row extraction on the original image signal, optionally, performing row extraction on the original image signal before performing digital-to-analog signal conversion, so as to speed up the processing speed of the processor.

In this embodiment, the original image signal is performed row extraction, so that the scanning time of the display image of the current frame image is shortened, and a certain time is reserved for the liquid crystal to return to the initial state before the next frame image signal arrives. The liquid crystal can respond more accurately to the image signal of the next frame image, so as to improve the sharpness of the display screen when playing motion images and bring a better experience to the viewer. At the same time, without increasing the cost, this method improves the clarity of motion images, improves the user's visual experience. Compared with existing products, it is more in line with consumer demand, and has more market advantage.

Figure 5:
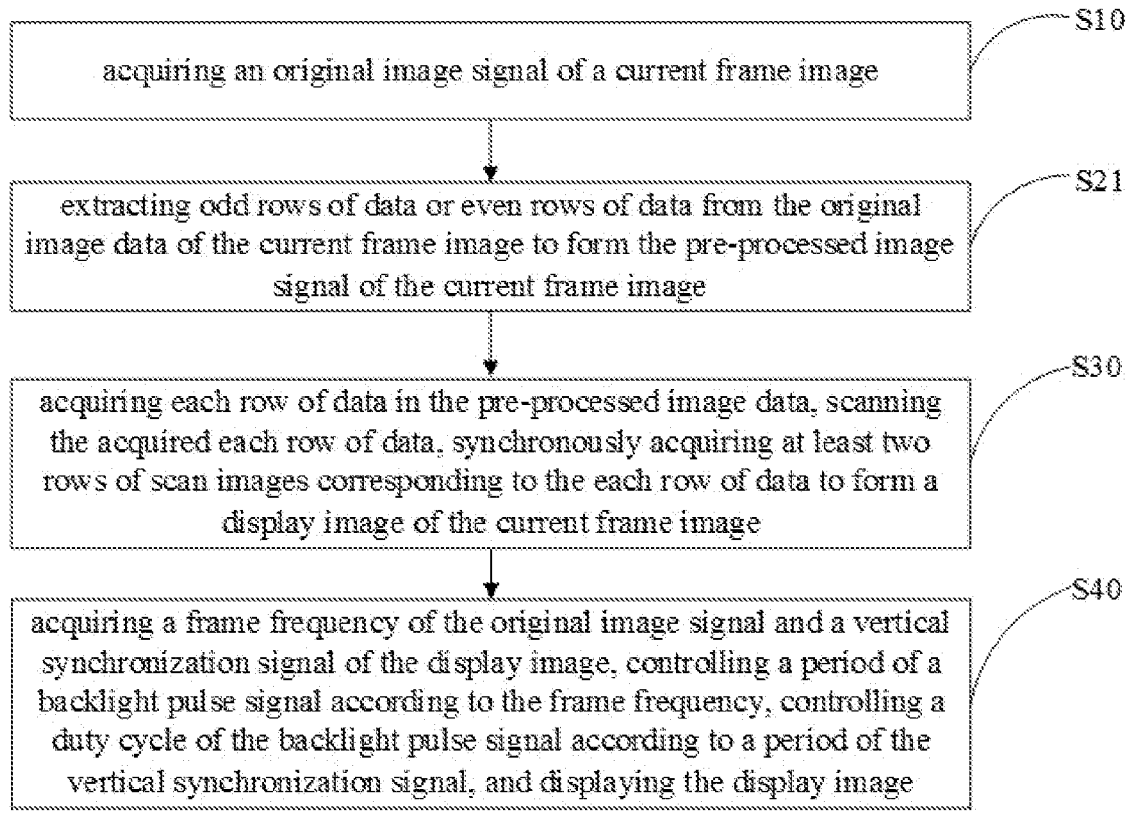
FIG. 5 is a schematic flowchart of the image display method according to a second embodiment of the present disclosure.

Referring to FIG. 5, FIG. 5 is a schematic flowchart of an image display method according to a second embodiment of the present disclosure. Based on the embodiment shown in FIG. 2, in this embodiment, the operation S20 includes:

Operation S21: extracting odd rows of data or even rows of data from the original image signal of the current frame image to form the pre-processed image signal of the current frame image.

Figure 3:
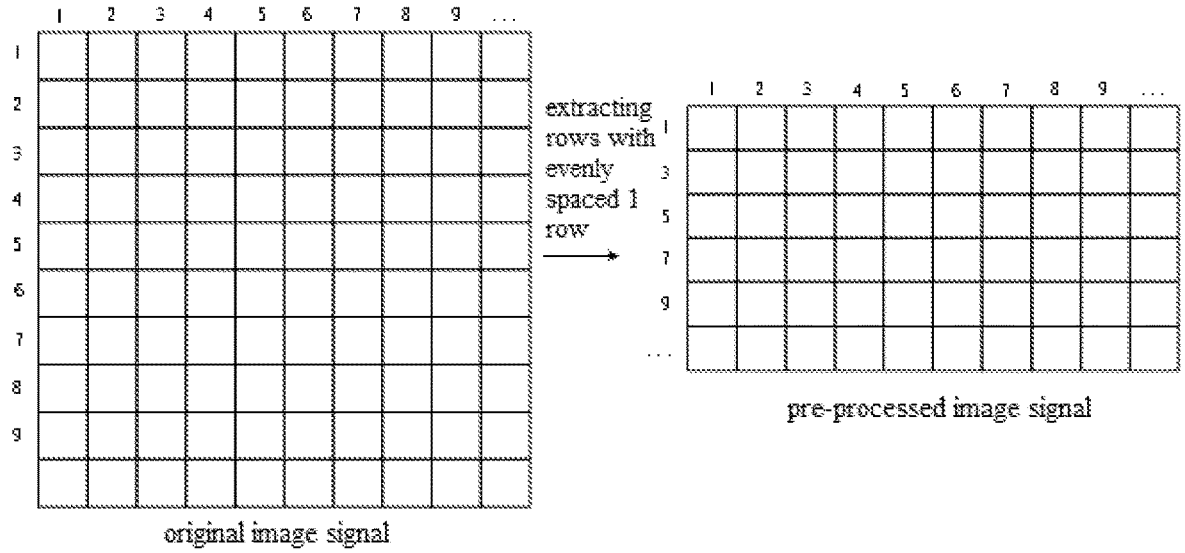
FIG. 3 is a schematic diagram of a row extraction rule of the image display method of the present disclosure.

In this embodiment, in consideration of the image quality of the display image after the row extraction and display, in order to minimize the degree of loss of the image, the odd rows of data or even rows of data are extracted from the current original image signal, that is, a row extraction rule for extracting rows with evenly spaced 1 row is adopted. Referring to FIG. 3, the rows of data included in the extracted pre-processed image signal at this time is the first row of data, the third row of data, the fifth row of data, the seventh row of data . . . a total of 1080 rows of data of the original image signal. At this time, the pre-processed image signal includes 1080 rows of data, each row includes 3840 pixels, and there are a total of 3840×1080 pixels; or the rows of data included in the extracted pre-processed image signal is the second row of data, the fourth row of data, the sixth row of data, the eighth row of data . . . a total of 1080 rows of data of the original image signal. At this time, the pre-processed image signal includes 1080 rows of data, each row includes 3840 pixels, and there are a total of 3840×1080 pixels. Acquiring each row of data in the pre-processed image signal, scanning the acquired each row of data, synchronously acquiring at least two rows of scan images corresponding to the each row of data. Taking synchronously scanning two rows of scan images as an example, referring to FIG. 4, acquiring the n-th row of data of the pre-processed image for scanning, and synchronously acquiring two rows of scan images corresponding to the n-th row of data. The acquired display image includes: an image of a first row of data, an image of a first row of data, an image of a third row of data, an image of a third row of data . . . , that is, each row of data is synchronized to acquiring two rows of the same scan images.

Figure 6:
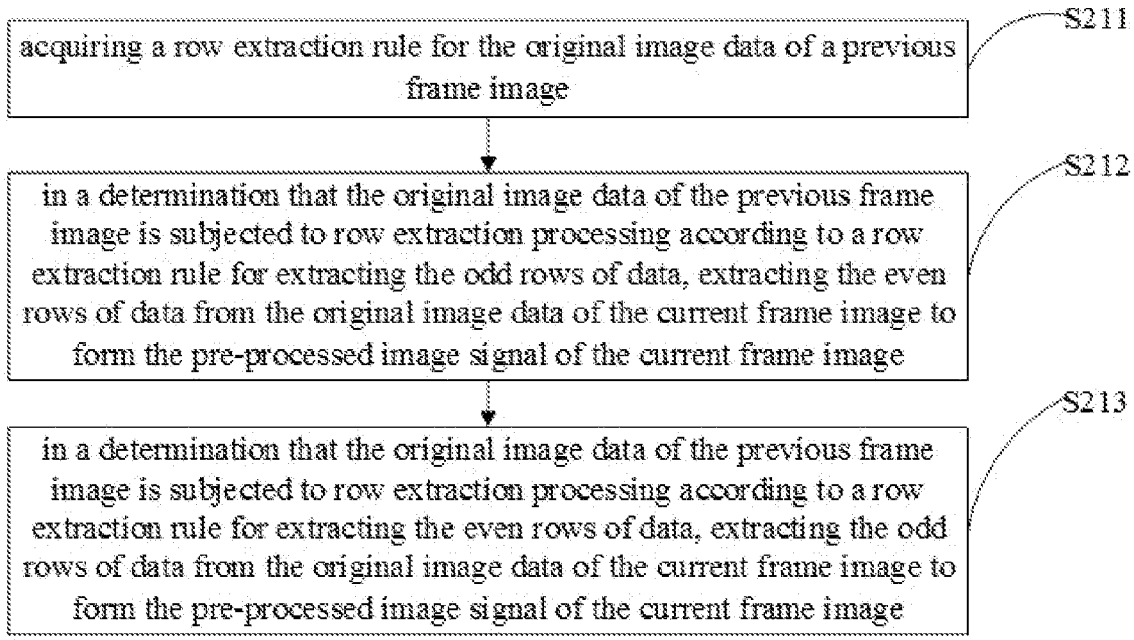
FIG. 6 is a schematic flowchart of the image display method according to a third embodiment of the present disclosure.

Referring to FIG. 6, FIG. 6 is a schematic flowchart of an image display method according to a third embodiment of the present disclosure. Based on the embodiment shown in FIG. 5, in this embodiment, the operation S21 includes:

Operation S211: acquiring a row extraction rule for the original image signal of a previous frame image;

Operation S212: in a determination that the original image signal of the previous frame image is subjected to row extraction processing according to a row extraction rule for extracting the odd rows of data, extracting the even rows of data from the original image signal of the current frame image to form the pre-processed image signal of the current frame image;

Operation S213: in a determination that the original image signal of the previous frame image is subjected to row extraction processing according to a row extraction rule for extracting the even rows of data, extracting the odd rows of data from the original image signal of the current frame image to form the pre-processed image signal of the current frame image.

In this embodiment, in order to further ensure the sharpness and the integrity of the image, and to avoid the situation that the removed rows of data is lost due to the row extraction according to the same row extraction rule, the row extraction rules between two adjacent frames are complementary to each other, and the rows of data that is lost in the previous frame can be displayed when the next frame is displayed, which is conductive to ensure the integrity of the original image. Specifically, when the original image signal of the previous frame image is extracted according to a row extraction rule for extracting odd rows of data, the original image signal of a frame image adjacent to the previous frame image adopts a complementary row extraction rule for extracting even rows of data.

Figure 7:
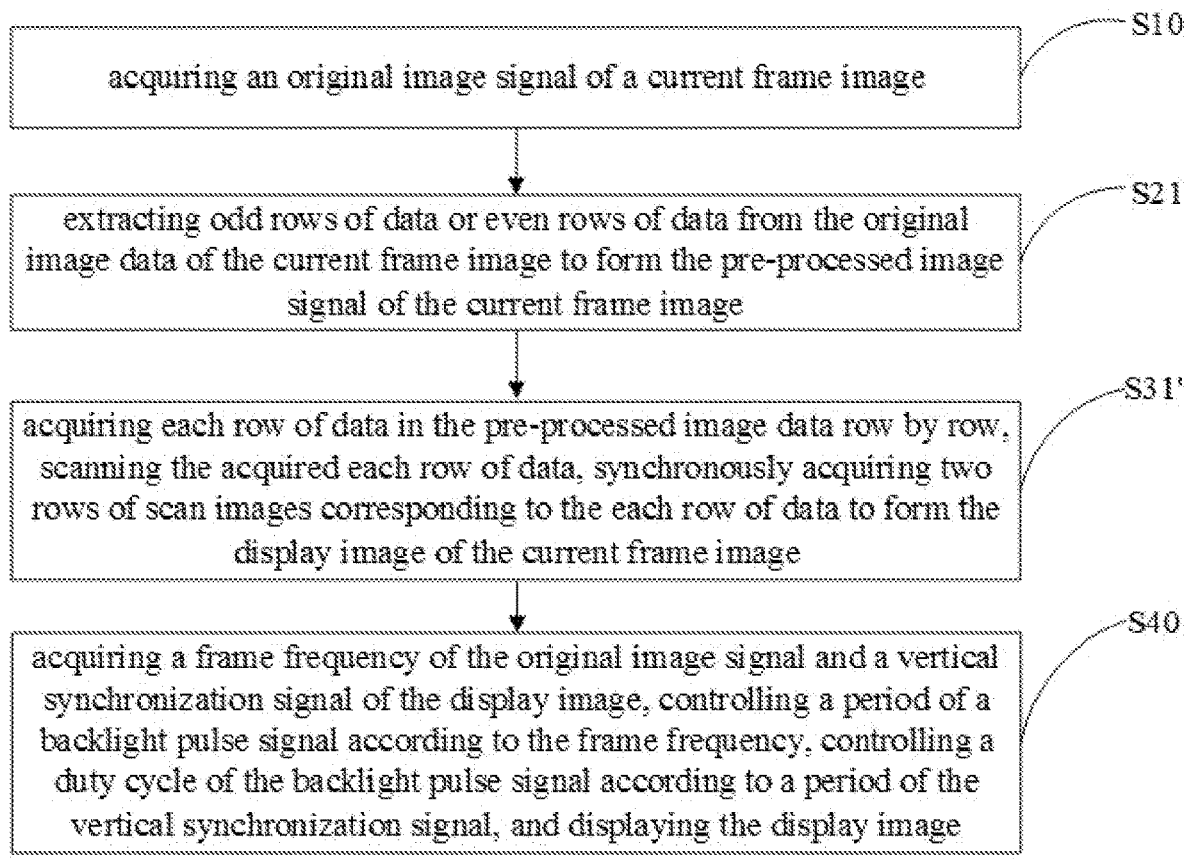
FIG. 7 is a schematic flowchart of the image display method according to a fourth embodiment of the present disclosure.

Referring to FIG. 7, FIG. 7 is a schematic flowchart of an image display method according to a fourth embodiment of the present disclosure. Based on the embodiment shown in FIG. 5, in this embodiment, the operation S30 includes:

Operation S31', acquiring each row of data in the pre-processed image signal row by row, scanning the acquired each row of data, synchronously acquiring two rows of scan images corresponding to the each row of data to form the display image of the current frame image.

In this implementation, based on the case where the resolution of the original image is consistent with the resolution of the display screen, after acquiring the original image signal of the current frame image, the original image is subjected to the row extraction processing in accordance with the preset odd/even row extraction rule to acquiring the pre-processed image signal. At this time, there is a double relationship between a number of rows of the pre-processed image signal and the resolution of the display screen. At this time, each row of data acquired is scanned, and two rows of scan images corresponding to each row of data are acquired simultaneously to form the display image of the current frame image.

Figure 8:
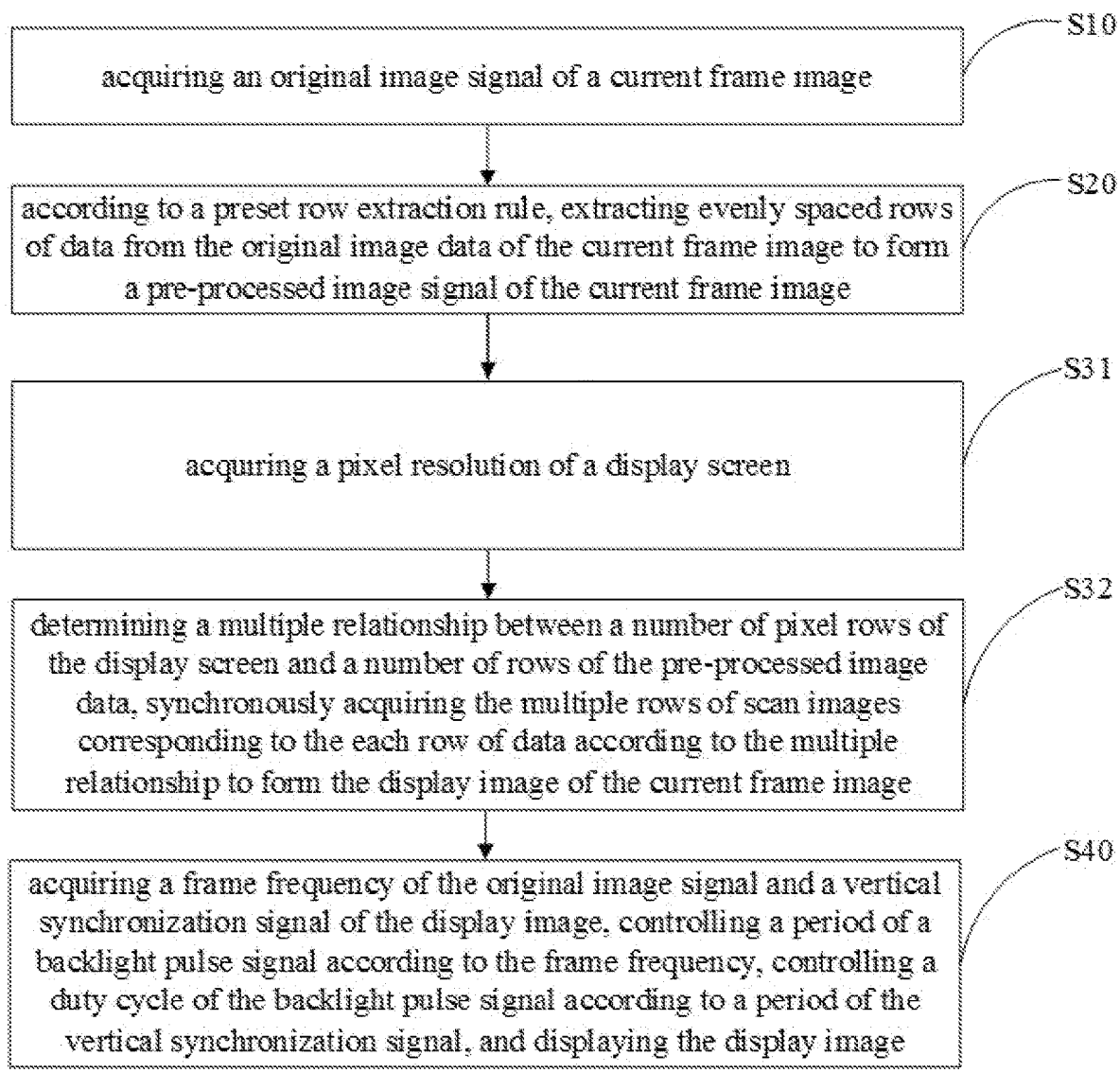
FIG. 8 is a schematic flowchart of the image display method according to a fifth embodiment of the present disclosure.

Referring to FIG. 8, FIG. 8 is a schematic flowchart of an image display method according to a fifth embodiment of the present disclosure. Based on the embodiment shown in FIG. 2, in this embodiment, the operation S30 includes:

Operation S31: acquiring a pixel resolution of a display screen;

Operation S32: determining a multiple relationship between a number of pixel rows of the display screen and a number of rows of the pre-processed image signal, synchronously acquiring the multiple rows of scan images corresponding to the each row of data according to the multiple relationship to form the display image of the current frame image.

In this embodiment, in order to ensure that the pre-processed image can be displayed on the full screen after scanning after the original image signal is subjected to row extraction processing, it is necessary to acquiring the pixel resolution of the display screen, and calculating a multiple relationship between the number of pixel rows of the display screen and the number of rows of the pre-processed image signal, and determining that each row of data of the pre-processed image needs to be scanned in the multiple of the rows simultaneously to acquiring the display image of the current frame image. For example, the number of rows of the pre-processed image signal is 720, and the number of pixel rows of the display screen is 2160. At this time, there is a three-times relationship between the number of pixel rows of the display screen and the number of rows of pre-processed image signal. At this time, when scanning each row of data, three rows of scan images corresponding to each row of data should be acquired simultaneously, so that the row pixels of the display screen can form a continuous image.

When the resolution of the original image signal is not the same as the pixel resolution of the display screen, after acquiring the resolution of the display screen, new original image signal may be acquired by scaling the original image according to a certain calculation method, and then the new original image signal is subjected to row extraction processing to form the pre-processed image signal. At this time, the pre-processed image signal is scanned synchronously in multiple rows to acquiring a display image.

Figure 9:
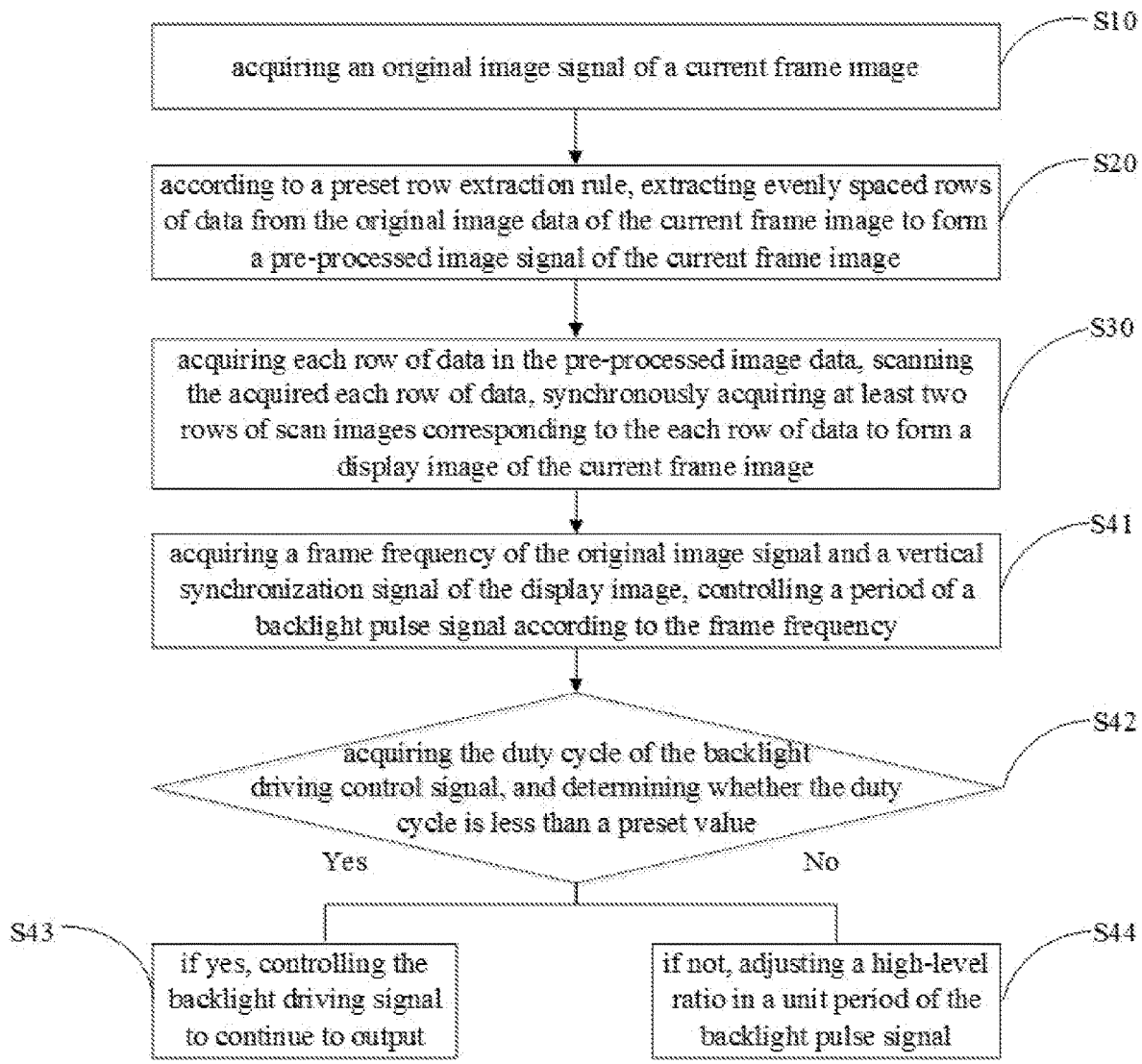
FIG. 9 is a schematic flowchart of the image display method according to a sixth embodiment of the present disclosure.

Referring to FIG. 9, FIG. 9 is a schematic flowchart of an image display method according to a sixth embodiment of the present disclosure. Based on the embodiment shown in FIG. 2, in this embodiment, the operation S40 includes:

Operation S41: acquiring a frame frequency of the original image signal and a vertical synchronization signal of the display image, controlling a period of a backlight pulse signal according to the frame frequency;

Operation S42: acquiring the duty cycle of the backlight pulse signal, and determining whether the duty cycle is less than a preset value;

Operation S43: if yes, controlling the backlight pulse signal to continue to output;

Operation S44: if not, adjusting a high-level ratio in a unit period of the backlight pulse signal.

In this embodiment, the period of the backlight pulse signal is determined according to the frame frequency of the original image signal. The frame frequency refers to a number N of frames (that is, static images) that can be played in one second. The scanning time from the start of the first row to the end of the last row of each frame of the original image is 1/N seconds, that is, it takes 1/N seconds to display one frame of the original image, at this time, the period of the backlight pulse signal is controlled to be 1/N seconds. At the same time, the duty cycle of the backlight pulse signal is controlled according to the period of the vertical synchronization signal of the display image. The duty cycle refers to the percentage of the backlight source that is on in one period, and the period of the vertical synchronization signal of the display image refers to the time required for the vertical scanning of the display image. Since the time for forming the display image from the start of scanning the pre-processed image to the end of scanning the pre-processed image is less than the time for scanning each frame of the original image, when the scanning of the pre-processed image is finished and the next frame of data is received, the backlight source should be off to give the liquid crystal time to return to the original state. Therefore, the duty cycle of the backlight pulse signal needs to be adjusted according to the period of the vertical synchronization signal of the display image.

It can be understood that the foregoing preset value is determined according to a ratio of the period of the vertical synchronization signal of the display image to time taken by the original image signal to display a single frame image. For example, when the odd/even row extraction rule is adopted, and two rows of scan images are acquired synchronously in accordance with each row of data, the period of the vertical synchronization signal of the display image of the current frame image is a half of the time taken by the original image signal to display a single frame image, then the preset value may be set to 50%. When extracting rows with evenly spaced 2 rows, the period of the vertical synchronization signal of the display image of the current frame image is one third of the time taken by the original image signal to display a single frame image, then the preset value may be set to 33%. As for why the duty cycle of the backlight pulse signal cannot be equal to the preset value, it is because the backlight source needs a certain buffering time when undergoing a periodic change.

Figure 10:
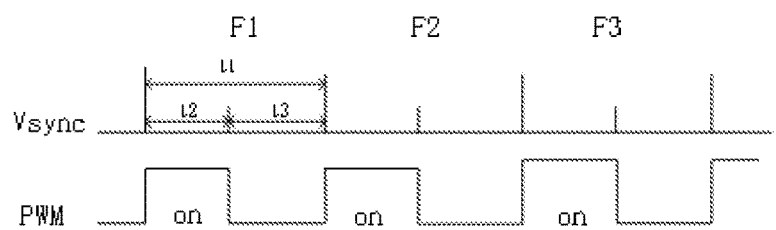
FIG. 10 is a principle diagram of the image display method of the present disclosure.

Referring to FIGS. 10, F1, F2, and F3 in the Vsync line represent a first frame image, a second frame image, and a third frame image. Time t1 indicates the time it takes to scan a frame according to the original image signal, t2 indicates the time it takes to scan a frame for a display image (or pre-processed image), and t3 indicates the response time reserved for the liquid crystal. The backlight pulse signal is indicated by the PWM line, where on indicates that the backlight source is on. It can be seen from FIG. 10, in this embodiment, the time the backlight source is on is within the time it takes to scan a frame for a display image (or pre-processed image), and the backlight source is in low level, that is, the backlight source is off corresponding to the time period t3. When the liquid crystal is in the t3 stage, the time for the liquid crystal to hold the image display ends, and the liquid crystal returns to the initial state. When the signal of the next frame arrives, the liquid crystal can respond quickly to accurately display the image, thereby avoiding dragging phenomenon and improving the clarity of the motion image.

In addition, the present disclosure further provides an image display device, including a memory 1005, a processor 1001, and an image display program stored on the memory 1005 and executable on the processor 1001, and the processor 1001 executes the image display program to implement the following operations:

Operation S10: acquiring an original image signal of a current frame image;

Operation S20: according to a preset row extraction rule, extracting evenly spaced rows of data from the original image signal of the current frame image to form a pre-processed image signal of the current frame image;

Operation S30: acquiring each row of data in the pre-processed image signal, scanning the acquired each row of data, synchronously acquiring at least two rows of scan images corresponding to the each row of data to form a display image of the current frame image;

Operation S40: acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

In this embodiment, the original image signal is performed row extraction, so that the scanning time of the display image of the current frame image is shortened, and a certain time is reserved for the liquid crystal to return to the initial state before the next frame image signal arrives. The liquid crystal can respond more accurately to the image signal of the next frame image, so as to improve the sharpness of the display screen when playing motion images and bring a better experience to the viewer. At the same time, without increasing the cost, this method improves the clarity of motion images and the user's visual experience. Compared with existing products, it is more in line with consumer demand, and has more market advantage.

Further, the operation S20 of according to a preset row extraction rule, extracting evenly spaced rows of data from the original image signal of the current frame image to form a pre-processed image signal of the current frame image includes:

Operation S21: extracting odd rows of data or even rows of data from the original image signal of the current frame image to form the pre-processed image signal of the current frame image.

Further, the operation S21 includes:

Operation S211: acquiring a row extraction rule for the original image signal of a previous frame image;

Operation S212: in a determination that the original image signal of the previous frame image is subjected to row extraction processing according to a row extraction rule for extracting the odd rows of data, extracting the even rows of data from the original image signal of the current frame image to form the pre-processed image signal of the current frame image;

Operation S213: in a determination that the original image signal of the previous frame image is subjected to row extraction processing according to a row extraction rule for extracting the even rows of data, extracting the odd rows of data from the original image signal of the current frame image to form the pre-processed image signal of the current frame image.

Further, the operation S30 includes:

Operation S31', acquiring each row of data in the pre-processed image signal row by row, scanning the acquired each row of data, synchronously acquiring two rows of scan images corresponding to the each row of data to form the display image of the current frame image.

In this embodiment, based on the case where the resolution of the original image is consistent with the resolution of the display screen, after acquiring the original image signal of the current frame image, the original image is subjected to the row extraction processing in accordance with the preset odd/even row extraction rule to acquiring the pre-processed image signal. At this time, there is a double relationship between a number of rows of the pre-processed image signal and the resolution of the display screen. At this time, performing two-row synchronous scanning on each row of data acquired to acquire the display image of the current frame image.

Further, the operation S30 includes:

Operation S31: acquiring a pixel resolution of a display screen;

Operation S32, determining a multiple relationship between a number of pixel rows of the display screen and a number of rows of the pre-processed image signal, synchronously acquiring the multiple rows of scan images corresponding to the each row of data according to the multiple relationship to form the display image of the current frame image.

Further, the operation S40 includes:

Operation S41: acquiring a frame frequency of the original image signal and a vertical synchronization signal of the display image, controlling a period of a backlight pulse signal according to the frame frequency;

Operation S42: acquiring the duty cycle of the backlight pulse signal, and determining whether the duty cycle is less than a preset value;

Operation S43: if yes, controlling the backlight pulse signal to continue to output;

Operation S44: if not, adjusting a high-level ratio in a unit period of the backlight pulse signal.

The present disclosure provides a smart TV, including a processor, a memory, and an image display program stored on the memory and executable on the processor, and the processor executes the image display program to implement the operations of the image display method according to any one of the above mentioned embodiment.

For the method implemented when the image display program is executed, reference may be made to various embodiments of the image display method of the present disclosure, and details are not described herein again.

The present disclosure further provides a readable storage medium having stored thereon a control program, where a processor executes the image display program to implement the image display method according to any one of the above mentioned embodiment.

For the method implemented when the image display program is executed, reference may be made to various embodiments of the image display method of the present disclosure, and details are not described herein again.

Those skilled in the art should understand that the embodiments of the present disclosure may be provided as a method, a system, or a computer program product. Therefore, this disclosure may take the form of an entirely hardware embodiment, an entirely software embodiment, or an embodiment combining software and hardware aspects. Moreover, this disclosure may take the form of a computer program product implemented on one or more computer-usable storage media (including but not limited to disk storage, CD-ROM, optical storage, etc.) containing computer-usable program code.

This disclosure is described with reference to flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general-purpose computer, special-purpose computer, embedded processor, or other programmable data processing device to produce a machine, so that the instructions generated by the processor of the computer or other programmable data processing device are used to generate devices for realizing the functions specified in one or more flowcharts and/or one or more blocks of the block diagrams.

These computer program instructions may also be stored in a computer-readable memory capable of directing a computer or other programmable data processing device to work in a particular manner such that the instructions stored in the computer-readable memory produce a manufactured article including an instruction device, the instruction device implements the functions specified in one or more flowcharts and/or one or more blocks of the block diagram.

These computer program instructions can also be loaded on a computer or other programmable data processing device, so that a series of operations can be performed on the computer or other programmable device to produce a computer-implemented process, thus instructions executed on a computer or other programmable device provide operations for implementing the functions specified in one or more processes and/or blocks in a block diagram of a flowchart.

It should be noted that in the claims, any reference signs placed between parentheses shall not be construed as limiting the claim. The word "comprising" does not exclude the presence of elements or operations not listed in a claim. The word "a" or "an" preceding a part does not exclude the presence of a plurality of such parts. The disclosure can be implemented by means of hardware comprising several distinct parts, and by means of a suitably programmed computer. In the unit claim listing several devices, several of these devices may be embodied by the same hardware item. The use of the words first, second, and third does not imply any order. These words can be interpreted as names.

Although the preferred embodiments of the present disclosure have been described, those skilled in the art can make other changes and modifications to these embodiments once they know the basic inventive concepts. Therefore, the enclosed claims are intended to be construed to include the preferred embodiments and all changes and modifications that fall within the scope of this disclosure.

The above are only preferred embodiments of the present disclosure, and do not limit the patent scope of the present disclosure. Any equivalent structural transformation made by using the specification and drawings of the present disclosure under the inventive concept of the present disclosure or direct/indirect use in other related technical fields shall be included in the patent protection scope of this disclosure.

What is claimed is:

1. An image display method, comprising the following operations:
    acquiring an original image signal of a current frame image;
    according to a preset row extraction rule, extracting evenly spaced rows of data from the original image signal of the current frame image to form a pre-processed image signal of the current frame image;
    acquiring a pixel resolution of a display screen;
    determining a multiple relationship between a number of pixel rows of the display screen and a number of rows of the pre-processed image signal, synchronously acquiring the multiple rows of scan images corresponding to the each row of data according to the multiple relationship to form a display image of the current frame image;
    and
    acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

2. The image display method according to claim 1, wherein the operation of according to a preset row extraction rule, extracting evenly spaced rows of data from the original image signal of the current frame image to form a pre-processed image signal of the current frame image comprises:
    extracting odd rows of data or even rows of data from the original image signal of the current frame image to form the pre-processed image signal of the current frame image.

3. The image display method according to claim 2, wherein the operation of according to a preset row extraction rule, extracting evenly spaced rows of data from the original image signal of the current frame image to form a pre-processed image signal of the current frame image comprises:
    acquiring a row extraction rule for the original image signal of a previous frame image;
    in a determination that the original image signal of the previous frame image is subjected to row extraction processing according to a row extraction rule for extracting the odd rows of data, extracting the even rows of data from the original image signal of the current frame image to form the pre-processed image signal of the current frame image; and
    in a determination that the original image signal of the previous frame image is subjected to row extraction processing according to a row extraction rule for extracting the even rows of data, extracting the odd rows of data from the original image signal of the current frame image to form the pre-processed image signal of the current frame image.

4. The image display method according to claim 3, wherein the operation of controlling a duty cycle of the backlight pulse signal according to a period of the vertical synchronization signal comprises:
    acquiring the duty cycle of the backlight pulse signal, and determining whether the duty cycle is less than a preset value;
    if yes, controlling the backlight pulse signal to continue to output; and
    if not, adjusting a high-level ratio in a unit period of the backlight pulse signal.

5. The image display method according to claim 2, wherein the operation of acquiring each row of data in the pre-processed image signal, scanning the acquired each row of data, synchronously acquiring at least two rows of scan images corresponding to the each row of data to form a display image of the current frame image comprises:

acquiring each row of data in the pre-processed image signal row by row, scanning the acquired each row of data, synchronously acquiring two rows of scan images corresponding to the each row of data to form the display image of the current frame image.

6. The image display method according to claim 5, wherein the operation of acquiring each row of data in the pre-processed image signal, scanning the acquired each row of data, synchronously acquiring at least two rows of scan images corresponding to the each row of data to form a display image of the current frame image comprises:

acquiring each row of data in the pre-processed image signal row by row, scanning the acquired each row of data, synchronously acquiring two rows of scan images corresponding to the each row of data to form the display image of the current frame image.

7. The image display method according to claim 2, wherein the operation of controlling a duty cycle of the backlight pulse signal according to a period of the vertical synchronization signal comprises:

acquiring the duty cycle of the backlight pulse signal, and determining whether the duty cycle is less than a preset value;

if yes, controlling the backlight pulse signal to continue to output; and if not, adjusting a high-level ratio in a unit period of the backlight pulse signal.

8. The image display method according to claim 1, wherein the operation of controlling a duty cycle of the backlight pulse signal according to a period of the vertical synchronization signal comprises:

acquiring the duty cycle of the backlight pulse signal, and determining whether the duty cycle is less than a preset value;

if yes, controlling the backlight pulse signal to continue to output; and if not, adjusting a high-level ratio in a unit period of the backlight pulse driving signal.

9. The image display method according to claim 8, wherein the preset value is determined according to a ratio of the period of the vertical synchronization signal of the display image to time taken by the original image signal to display a single frame image.

10. The image display method according to claim 1, wherein the operation of acquiring each row of data in the pre-processed image signal, scanning the acquired each row of data, synchronously acquiring at least two rows of scan images corresponding to the each row of data to form a display image of the current frame image comprises:

acquiring a pixel resolution of a display screen; and determining a multiple relationship between a number of pixel rows of the display screen and a number of rows of the pre-processed image signal, synchronously acquiring the multiple rows of scan images corresponding to the each row of data according to the multiple relationship to form the display image of the current frame image.

11. A smart TV, comprising a processor, a memory, and an image display program stored on the memory and executable on the processor, and the processor executes the image display program to implement the following operations of an image display method:

acquiring an original image signal of a current frame image;

according to a preset row extraction rule, extracting evenly spaced rows of data from the original image signal of the current frame image to form a pre-processed image signal of the current frame image;

acquiring a pixel resolution of a display screen;

determining a multiple relationship between a number of pixel rows of the display screen and a number of rows of the pre-processed image signal, synchronously acquiring the multiple rows of scan images corresponding to the each row of data according to the multiple relationship to form a display image of the current frame image;

and acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

12. The smart TV according to claim 11, wherein the operation of according to a preset row extraction rule, extracting evenly spaced rows of data from the original image signal of the current frame image to form a pre-processed image signal of the current frame image comprises:

extracting odd rows of data or even rows of data from the original image signal of the current frame image to form the pre-processed image signal of the current frame image.

13. The smart TV according to claim 12, wherein the operation of according to a preset row extraction rule, extracting evenly spaced rows of data from the original image signal of the current frame image to form a pre-processed image signal of the current frame image comprises:

acquiring a row extraction rule for the original image signal of a previous frame image;

in a determination that the original image signal of the previous frame image is subjected to row extraction processing according to a row extraction rule for extracting the odd rows of data, extracting the even rows of data from the original image signal of the current frame image to form the pre-processed image signal of the current frame image;

and in a determination that the original image signal of the previous frame image is subjected to row extraction processing according to a row extraction rule for extracting the even rows of data, extracting the odd rows of data from the original image signal of the current frame image to form the pre-processed image signal of the current frame image.

14. The smart TV according to claim 12, wherein the operation of acquiring each row of data in the pre-processed image signal, scanning the acquired each row of data, synchronously acquiring at least two rows of scan images corresponding to the each row of data to form a display image of the current frame image comprises:

acquiring each row of data in the pre-processed image signal row by row, scanning the acquired each row of data, synchronously acquiring two rows of scan images corresponding to the each row of data to form the display image of the current frame image.

15. A readable storage medium having stored thereon an image display program, wherein a processor executes the image display program to implement the following operations of an image display method:

acquiring an original image signal of a current frame image;

according to a preset row extraction rule, extracting evenly spaced rows of data from the original image signal of the current frame image to form a pre-processed image signal of the current frame image;

acquiring a pixel resolution of a display screen;

determining a multiple relationship between a number of pixel rows of the display screen and a number of rows of the pre-processed image signal, synchronously acquiring the multiple rows of scan images corresponding to the each row of data according to the multiple relationship to form a display image of the current frame image;

and acquiring a frame frequency of the original image signal and a vertical synchronization signal of the display image, controlling a period of a backlight pulse signal according to the frame frequency, controlling a duty cycle of the backlight pulse signal according to a period of the vertical synchronization signal, and displaying the display image.

16. The readable storage medium according to claim 15, wherein the operation of according to a preset row extraction rule, extracting evenly spaced rows of data from the original image signal of the current frame image to form a pre-processed image signal of the current frame image comprises:

extracting odd rows of data or even rows of data from the original image signal of the current frame image to form the pre-processed image signal of the current frame image.

17. The readable storage medium according to claim 16, wherein the operation of according to a preset row extraction rule, extracting evenly spaced rows of data from the original image signal of the current frame image to form a pre-processed image signal of the current frame image comprises:

acquiring a row extraction rule for the original image signal of a previous frame image;

in a determination that the original image signal of the previous frame image is subjected to row extraction processing according to a row extraction rule for extracting the odd rows of data, extracting the even rows of data from the original image signal of the current frame image to form the pre-processed image signal of the current frame image; and in a determination that the original image signal of the previous frame image is subjected to row extraction processing according to a row extraction rule for extracting the even rows of data, extracting the odd rows of data from the original image signal of the current frame image to form the pre-processed image signal of the current frame image.

* * * * *